3,248,223
ANIMAL FEEDS AND METHODS
Jacob Christopher Bauernfeind, Glen Rock, N.J., assignor to Hoffmann-La Roche Inc., Nutley, N.J., a corporation of New Jersey
No Drawing. Filed Apr. 11, 1962, Ser. No. 186,652
8 Claims. (Cl. 99—2)

This invention relates to animal feeds and to methods of feeding animals. More particularly, the invention relates to growth-promoting agents and animal feed compositions containing a growth-promoting agent; to feed supplements containing a growth-promoting agent which can be administered with conventional animal feeds or conventional rations for animals or nutrients or other diluent materials suitable for oral ingestion by animals, such feed supplements thus being useful also to prepare the animal feed compositions of the invention; and to improved methods of growing animals by feeding them the animal feed compositions or feed supplement of the invention.

The growth-promoting agents employed above or in the feed compositions and supplements of the invention have the following formula

I)

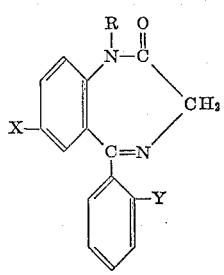

wherein X is nitro or halogen; R is hydrogen or lower alkyl, preferably methyl; and Y is hydrogen, trifluoromethyl, or halogen. The term "halogen" used above for X and/or Y includes fluorine, chlorine, bromine, or iodine, with chlorine preferred.

Examples of compounds having the above structure include 7-chloro-5-phenyl-1-methyl-3H-1,4-benzodiazepin-2(1H)-one; 7-nitro-5-($\alpha,\alpha,\alpha$-trifluoro-o-tolyl)-3H-1,4-benzodiazepin-2(1H)-one; 7-nitro-5-(2-chlorophenyl)-3H-1,4-benzodiazepin-2(1H)-one, etc.

The animals for which the present compositions and methods are intended are economically useful animals and birds, e.g., ruminants such as cattle and sheep, and monogastric animals and birds such as pigs and turkeys. The term "animal" as used hereinafter is understood to include economically useful animals and birds.

The animal feed compositions of the invention can be made by mixing a compound of Formula I with conventional ingredients of animal feeds. The mixing can be accomplished by methods known per se. Conventional methods of making the improved animal feeds of the invention comprise charging conventional feed ingredients and a compound of Formula I into a batch mixer and operating the mixer until the contents thereof are uniformly dispersed to give a mixture which is homogeneous throughout. An alternative mixture of preparing animal feeds according to the invention comprises adding a feed supplement containing a compound of Formula I to a conventional animal feed or administering the supplement to the animal directly. Thus, it will often be convenient to premix the compounds of Formula I with a diluent which is suitable for oral ingestion by the animal (this diluent may itself be a nutrient material for the animal) and subsequently to mix the premixed supplement so-obtained with a commercially obtainable conventional animal feed material so as to obtain the improved animal feed compositions of the invention. As another alternative, a compound of Formula I may be intimately admixed with a material such as corn meal or soy bean oil to give a uniformly blended composition, and the feed supplement composition containing a compound of Formula I so-obtained may be subsequently mixed with additional nutrient ingredients suitable to make a finished improved feed according to the invention. Preferably the compound of Formula I is employed in the feed supplement or finished feed in an amount that will supply the animal with a daily intake of about 1 mg. to about 100 mg., preferably about 2 mg. to about 50 mg., per head per day. This can generally be accomplished by providing from about 1 mg. to about 100 mg. of a compound of Formula I per pound of finished feed; but it should be understood that the invention embraces the use of any proportion of compound of Formula I that will give beneficial and economically desirable results in the utilization by the animal of its feed. An especially preferred proportion of compound of Formula I in the feed is from about 2 mg. to about 50 mg. per pound of finished feed.

The novel methods of the invention whereby a compound of Formula I is made a part of the animal's diet can be practiced by feeding growing animals on complete animal feed rations, improved by incorporation of the compound of Formula I therein according to the present invention. Alternatively, it may be desirable in some cases to feed the animal a feed composition containing a compound of Formula I, which contains less nutrient material than is found in the animal's total diet. For example, the animal can be fed alternately on conventional rations and on compositions of the invention containing a compound of Formula I, or the compound of Formula I can be dispensed in the animal's drinking water and can be furnished to the animal in this way.

Diethyl stilbestrol is a commonly used growth-promoting agent in animal feeds. It has also been found that the addition of from about 1 mg. to about 100 mg. per head per day of a compound of Formula I in addition to the usual level of 10 mg. of diethyl stilbestrol per head per day to conventional animal feeds produces a marked increase in animal growth over that obtained with diethyl stilbestrol alone. However, as discussed above, a compound of Formula I can be employed alone in the compositions of the invention without the presence of any diethyl stilbestrol.

The growth-promoting agents of the invention can also be used in conjunction with other feed additives, e.g., antibiotics, hormones, enzymes, arsenicals, coccidiostats, etc.

Preferred aspects of the invention relate to cattle feed compositions comprising cattle nutrients and a compound of Formula I and to methods of growing cattle by feeding them such compositions. It has been found that cattle growing on animal feed compositions comprising conventional rations and, in addition, a compound of Formula I consume feed with greater efficiency, i.e., it takes less feed when employing the cattle feed of the compositions to procure a desired gain in weight of the cattle than when employing conventional cattle feed compositions.

The following examples are illustrative but not limitative of the invention.

In the following examples the animals given in the examples were fed with the feed rations shown therein for the feeding period shown therein and were allowed to consume as much feed as they desired.

EXAMPLE 1

*600 lb. feeder cattle—120 day feeding period*

| Control high grain-part roughage ration: | Percent |
|---|---|
| Barley | 60 |
| Molasses | 10 |
| Soybean-mineral supplement | 10 |
| Alfalfa hay | 20 |
| | 100 |

| Groups—10 cattle per group | Gain in wt. (lb./head/day) | Feed utilization (lb. feed/lb. gain) |
|---|---|---|
| Control ration | 2.80 | 9.0 |
| Control ration plus 10 mg. 7-chloro-5-phenyl-1-methyl-3H-1,4-benzodiazepin-2(1H)-one [1] per head per day | 3.15 | 8.6 |
| Control ration plus 10 mg. 7-nitro-5-($\alpha,\alpha,\alpha$-trifluoro-o-tolyl)-3H-1,4-benzodiazepin-2(1H)-one [1] per head per day | 3.10 | 8.5 |
| Control ration plus 10 mg. 7-nitro-5-(2-chlorophenyl)-3H-1,4-benzodiazepin-2(1H)-one [1] per head per day | 3.10 | 8.6 |

[1] Fed mixed in the soybean-mineral supplement.

EXAMPLE 2

*800 lb. beef cattle—100-day feeding period*

| Control corn-silage ration: | Percent |
|---|---|
| Shelled corn | 40 |
| Corn silage | 48 |
| Soybean-molasses-mineral supplement | 12 |
| | 100 |

Chlortetracycline (as supplement) _____mg./head/day__ 75

| Groups—25 cattle per group | Gain in wt. (lb./head/day) | Feed utilization (lb. feed/lb. gain) |
|---|---|---|
| Control antibiotic ration | 1.7 | 16.0 |
| Control antibiotic ration plus 40 mg. 7-chloro-5-phenyl-1-methyl-3H-1,4-benzodiazepin-2(1H)-one [1] per head per day | 2.0 | 15.2 |

[1] Fed mixed in the soybean-molasses-mineral supplement.

EXAMPLE 3

*750 lb. feeder cattle—90-day feeding period*

| Control high grain-part roughage ration: | Percent |
|---|---|
| Grain mixture (wheat, barley, rye) | 65 |
| Molasses | 7.5 |
| Protein-vitamin-mineral supplement | 12.5 |
| Hay | 15.0 |
| | 100.0 |

Stilbestrol (in supplement)__mg./head/day__ 10

| Groups—30 cattle per group | Gain in wt. (lb./head/day) | Feed utilization (lb. feed/lb. gain) |
|---|---|---|
| Control hormone ration | 2.9 | 8.7 |
| Control hormone ration plus 20 mg. 7-chloro-5-phenyl-1-methyl-3H-1,4-benzodiazepin-2(1H)-one [1] per head per day | 3.2 | 8.4 |

[1] Fed as a special dry concentrate (20 mg. per 10 grams) in the grain mixture.

EXAMPLE 4

*700 lb. beef cattle—150-day wintering period*

| High roughage-supplement mixture ration: | Percent |
|---|---|
| Ground corn cobs | 80 |
| Soybean-molasses-vitamin-mineral supplement | 20 |
| | 100 |

Oxytetracycline (in supplement) _____mg./head/day__ 75
Protease-cellulace enzyme combination (in supplement) _____grams/head/day__ 3

| Groups—6 cattle per group | Gain in wt. (lb./head/day) | Feed utilization (lb. feed/lb. gain) |
|---|---|---|
| Control antibiotic-enzyme ration | 1.3 | 13.0 |
| Control antibiotic-enzyme ration plus 20 mg. 7-chloro-5-phenyl-1-methyl-3H-1,4-benzodiazepin-2(1H)-one [1] per head per day | 1.5 | 12.2 |

[1] Fed as a special dry concentrate (20 mg. per 10 grams) in the cob-supplement mixture.

EXAMPLE 5

*60 lb. lambs—80-day trial*

| Control high grain-part roughage ration | Percent |
|---|---|
| Ground whole ear corn | 83 |
| Alfalfa | 5 |
| Molasses | 4 |
| Soybean meal | 6 |
| Mineral-vitamin supplement | 2 |
| | 100 |

| Groups—9 lambs per group | Gain in wt. (lb./head/day) | Feed utilization (lb. feed/lb. gain) |
|---|---|---|
| Control ration | 0.36 | 4.0 |
| Control ration plus 5 mg. 7-chloro-5-phenyl-1-methyl-3H-1,4-benzodiazepin-2(1H)-one [1] | 0.41 | 3.8 |
| Control ration plus 5 mg. 7-nitro-5-($\alpha,\alpha,\alpha$-trifluoro-o-tolyl)-3H-1,4-benzodiazepin-2(1H)-one [1] | 0.43 | 3.9 |
| Control ration plus 5 mg. 7-nitro-5-(2-chlorophenyl)-3H-1,4-benzodiazepin-2(1H)-one [1] | 0.39 | 3.7 |
| Control ration plus hormone implant [2] | 0.39 | 3.9 |
| Control ration plus hormone implant [2] plus 5 mg. 7-chloro-5-phenyl-1-methyl-3H-1,4-benzodiazepin-2(1H)-one [1]/head/day | 0.46 | 3.6 |

[1] Fed mixed in the complete ration.
[2] 50 mg. progesterone plus 5 mg. estradial benzoate implanted subcutaneously between skin and cartilage of ear at the beginning of the feeding trial.

EXAMPLE 6

*50 lb. pigs—to market weight, 200 lbs.*

| Control fattening ration: | Percent |
|---|---|
| Ground corn | 78 |
| Soybean meal | 20 |
| Mineral-vitamin supplement | 2 |
| | 100 |

3 nitro-4-hydroxy-phenylarsonic acid (in supplement) _____percent of ration__ 0.004

| Groups | Gain in wt. (lb./head/day) | Feed utilization (lb. feed/lb. gain) |
|---|---|---|
| Control arsenical ration | 1.5 | 3.8 |
| Control arsenical ration plus 5 mg. 7-chloro-5-phenyl-1-methyl-3H-1,4-benzodiazepin-2(1H)-one per lb. of ration | 1.6 | 3.6 |

EXAMPLE 7

Young turkey poults—16 week study

| Control growing ration: | Percent |
|---|---|
| Corn meal | 38 |
| Soybean oil meal | 37 |
| Middlings | 5 |
| Fish meal | 5 |
| Meat scraps | 5 |
| Fat | 2 |
| Alfalfa | 2 |
| Distillers solubles | 3 |
| Mineral vitamin supplements | 3 |
| | 100 |

Furazolidone (NF–180) (in supplement) _____ percent of ration __ 0.010
Amprol (in supplement) _____ do __ 0.010

| Groups | Gain in wt. (wt. in lbs.) | Feed utilization (lb. feed/ lb. gain) |
|---|---|---|
| Control nitrofuran-coccidiostat ration | 14.5 | 3.0 |
| Control nitrofuran-coccidiostat ration plus 25 mg. 7-chloro-5-phenyl-1-methyl-3H-1,4-benzodiazepin-2(1H)-one per lb. of ration | 16.0 | 2.8 |

I claim:

1. An animal feed composition comprising nutrient material for the animal and from about 1 to about 100 mg. per pound of feed composition of a compound having the formula

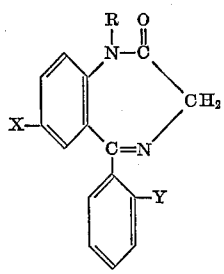

wherein X is selected from the group consisting of nitro and halo groups, R is selected from the group consisting of hydrogen and lower alkyl, and Y is selected from the group consisting of hydrogen, halogen, and trifluoromethyl.

2. A composition according to claim 1 wherein the compound is 7-chloro-5-phenyl-1-methyl - 3H-1,4-benzodiazepin-2(1H)-one.

3. A composition according to claim 1 wherein the compound is 7-nitro-5-(α,α,α-trifluoro-o-tolyl)-3H-1,4-benzodiazepin-2(1H)-one.

4. A composition according to claim 1 wherein the compound is 7-nitro-5-(2-chlorophenyl)-3H-1,4-benzodiazepin-2(1H)-one.

5. A cattle feed comprising a feed ration for cattle and from about 1 to about 100 mg. per pound of feed ration of a compound having the formula

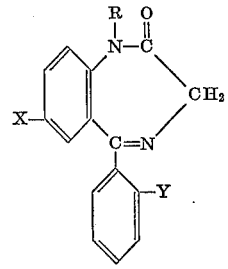

wherein X is selected from the group consisting of nitro and halo groups, R is selected from the group consisting of hydrogen and lower alkyl, and Y is selected from the group consisting of hydrogen, halogen, and trifluoromethyl.

6. An improvement in the preparation of an animal feed which comprises mixing from about 1 to about 100 mg. per pound of feed of a compound of the formula

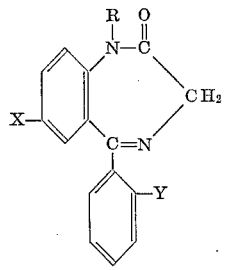

wherein X is selected from the group consisting of nitro and halo groups, R is selected from the group consisting of hydrogen and lower alkyl, and Y is selected from the group consisting of hydrogen, halogen, and trifluoromethyl,
with a material which is a nutrient for cattle.

7. An animal feed comprising nutrient material and a compound having the formula

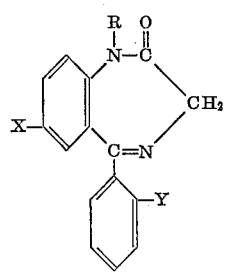

wherein X is selected from the group consisting of nitro and halo groups, R is selected from the group consisting of hydrogen and lower alkyl, and Y is selected from the group consisting of hydrogen, halogen, and trifluoromethyl,
said compound being present in a proportion of from about 2 mg. to about 50 mg. per pound of said animal feed.

8. A method of producing greater weight gains in animals and increasing feed efficiency which comprises feeding an animal a composition defined in claim 1.

References Cited by the Examiner

UNITED STATES PATENTS

| 2,893,992 | 7/1959 | Sternbach | 260—239 |
| 2,971,885 | 2/1961 | Luther et al. | 99—2 |
| 3,075,968 | 1/1963 | Krapcho | 260—239 |
| 3,123,529 | 3/1964 | Kariss et al. | 260—239.3 |

A. LOUIS MONACELL, *Primary Examiner.*

D. DONOVAN, *Assistant Examiner.*